United States Patent [19]

Crevel

[11] Patent Number: 4,494,184
[45] Date of Patent: Jan. 15, 1985

[54] PROCESS AND DEVICE FOR SERVO-CONTROL

[75] Inventor: Philippe Crevel, Angers, France

[73] Assignee: Motorola, Inc., Schaumburg, Ill.

[21] Appl. No.: 333,498

[22] Filed: Dec. 22, 1981

[30] Foreign Application Priority Data

Dec. 22, 1980 [FR] France ................. 80 27232

[51] Int. Cl.³ .................. G06F 15/20; B60H 3/00
[52] U.S. Cl. ..................... 364/178; 364/179;
364/183; 364/505; 364/557; 364/575; 318/636;
165/43; 165/28; 165/30
[58] Field of Search ............. 364/183, 178, 179, 557,
364/575, 505; 318/636, 615; 165/41, 42, 43, 44,
28, 30

[56] References Cited

U.S. PATENT DOCUMENTS

| | | | |
|---|---|---|---|
| 3,273,035 | 9/1966 | Inderhees | 318/636 X |
| 3,578,957 | 5/1971 | Gatlin | 364/178 |
| 4,143,706 | 3/1979 | Schnaibel et al. | 165/43 X |
| 4,176,456 | 12/1979 | von Beckmann | 364/575 X |
| 4,277,832 | 7/1981 | Wong | 364/178 X |
| 4,286,318 | 8/1981 | Immink et al. | 364/183 |
| 4,316,251 | 2/1982 | Saito et al. | 165/42 X |

Primary Examiner—Jerry Smith
Assistant Examiner—Allen MacDonald
Attorney, Agent, or Firm—James W. Gillman; James S. Pristelski; Phillip H. Melamed

[57] ABSTRACT

This invention relates to a process for servo-controlling a magnitude TI depending on a parameter $\theta$, whereby: the variations in time of a second magnitude TG which varies as a function of the parameter $\theta$ and to which the magnitude TI is related are monitored; a control signal TGE=TDS+TER is provided, TER being a function of the deviation between the reference value TR and the real value TI of the first magnitude, and the value of TDS being equal to the arithmetical mean between maximum and minimum values, TGEMX and TGEMN respectively, of the second magnitude TG determined previously; and the value of the parameter $\theta$ is adjusted to servo-control the second magnitude TG by the calculated value TGE.

13 Claims, 13 Drawing Figures

PROCESS AND DEVICE FOR SERVO-CONTROL

The present invention relates to a process for servo-controlling a first magnitude depending on at least one parameter, said process being of the type in which a control signal, a function of the deviation between a reference value and the real value of the first magnitude to be servo-controlled, is provided, and the value of said parameter is adjusted to servo-control, by the value of the control signal, a second magnitude which varies as a function of said parameter and to which the first magnitude is related.

In this domain of application, the present invention is more particularly, but non-exclusively, intended to be used in cases where the first magnitude to be servo-controlled depends not only on the parameter which is acted upon, but also on other parameters of which at least certain of these vary in an unforeseeable or not easily foreseeable manner.

An example of such a first magnitude is the temperature prevailing inside an enclosure placed in a changing environment. The second magnitude is in this case, for example, the temperature of a fluid (air or water) circulating in the air-conditioning system of this enclosure. In the following description, the case of air-conditioning of the passenger space of an automobile vehicle will be envisaged.

Of course, this example is given only by way of illustration and has no limiting character as far as the nature of the magnitude which may be servo-controlled is concerned.

This controlled magnitude may be a speed, a rate of flow, a pressure or any other physical magnitude capable of being servo-controlled by a process of the above-mentioned type.

Servo-controls with proportional action are known, within the calculated control signal is simply proportional to the difference between the reference value and the real value of the first magnitude to be servo-controlled. Now, in the case of this magnitude being influenced by one or more variable parameters other than the one which is acted upon directly, residual oscillations of the value of the servo-controlled magnitude, with deviations which may attain an unacceptable value, cannot be avoided. Thus, if the above-envisaged example of the passenger space of an automobile vehicle is taken, the temperature inside this space is not only a function of that of the ventilation air blown into the space, but also varies as a function of the outside temperature, the speed of the vehicle, the volume of the space, etc. . . .

In this particular example, knowledge of the instantaneous values of all the parameters influencing the temperature inside the passenger space could make it possible to determine the value of the temperature of the blown-in air, which, taking into account the losses, would lead to equality between the reference and real values. To this end, it would be necessary to draw up correspondence tables between ambient temperatures in the passenger space and temperatures of the blown-in air for all the possible values of different parameters such as the outside temperature, speed of the vehicle, rate of flow of blown-in air . . . . It is technically possible to draw up such tables, for example by wind tunnel tests, but this soon results in complex systems in view of the number of parameters to take into consideration, and therefore the number of sensors to be used. In addition, the tables are only valid for one given type of vehicle.

It is an object of the present invention to provide a process due to which a magnitude may be servo-controlled by considerably limiting the residual oscillations thereof even when it is subjected to the influence of parameters which the variations thereof are difficult or impossible to foresee, and without having to measure these parameters.

This purpose is attained by a process of the type indicated hereinabove, whereby, according to the invention, the variations in time of the second magnitude TG to be servo-controlled by the value of the control signal, are monitored, and the control signal TGE=TDS+TER is provided, TER being a function of the deviation between the reference value TR and the real value TI of the first magnitude, and the value of TDS being equal to the arithmetical mean between a maximum value TGEMX and a minimum value TGEMN of the second magnitude TG determined previously.

The value of TDS remains unchanged for a whole number of half-periods of the second magnitude TG, for example during one or two half-periods. In these latter cases, a new value TDS is calculated after each detection of a new minimum or maximum value of TG, or after detection of each new pair of values TGEMX and TGEMN.

The terminology period of the second magnitude TG denotes here the time gap separating two instants when the derivative with respect to time of this second magnitude TG passes the same value in the same direction, for example the time gap separating two successive peaks or two successive troughs of the curve representing the variations in time of the magnitude TG.

It is indicated hereinabove that the existence of variable parameters other than that parameter which is directly acted upon and influencing the first servo-controlled magnitude results in a considerable residual oscillation of said magnitude in the case of servo-control with proportional action. The gist of the invention consists in taking into account these parameters, not by measuring them and referring to pre-established tables, but by measuring their influence according to the variations in time of the second magnitude TG, to which are related those of the first magnitude to be servo-controlled. This indirect taking into account of the influence of the other parameters is effected in practice by providing a control signal TGE, for determining TG, of which one component TDS, at least in the course of each half-period of the magnitude TG, is the arithmetical mean between the maximum and the minimum of TG determined previously. To this component is added a feedback for example of proportional type by giving TER a value proportional to the deviation between the reference value TR and real value TI. Then, TGE=TDS+KI (TR−TI), the number KI having a predetermined constant value.

The servo-control of the second magnitude TG by the calculated value TGE may be effected by means of a servo-control with proportional action.

It is also an object of the present invention to provide a device for servo-controlling a first magnitude dependent on at least one parameter, said device comprising: a first and a second sensor furnishing measuring signals representative of said first magnitude and of a second magnitude which varies as a function of said parameter and to which the first magnitude is related; an adjusting member furnishing a reference signal respresentative of the reference value by which the first magnitude must be servo-controlled; means for controlling the value of said parameter; means for calculating a value by which said second magnitude must be servo-controlled; and control means for servo-controlling said second magnitude by controlling said parameter in accordance with said calculated value.

According to the invention, the calculating and servo-control means comprises: a microprocessor with a central processing unit associated with at least one random access memory and a read-only programed memory, and interface circuits connected to the microprocessor and comprising analog inputs receiving said measuring and reference signals and at least one analog output delivering a signal to said parameter control member.

The invention will be more readily understood on reading the following description with reference to the accompanying drawings, in which.

Figure 1:
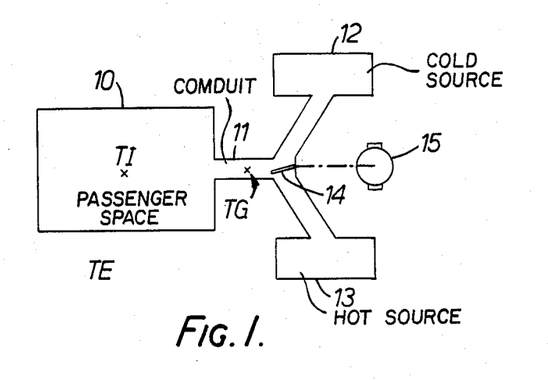
FIG. 1 is a schematic view of a system comprising the passenger space of an automobile vehicle in which the temperature is to be servo-controlled.

Referring now to the drawings, FIG. 1, shows schematically the passenger space 10 of an automobile vehicle. The passenger space 10 is air-conditioned by air being blown through a conduit TI connected to a cold source 12 and a hot source 13. The respective quantities of hot air and cold air in the pipe 11 are determined by the angular position of a mixer valve 14. A motor 15 is mechanically coupled to the valve 14 in order to rotate same.

The cold source may be constituted by a refrigeration unit with compressor, the negative calories being conveyed by air circulating in contact with the evaporator.

The hot source may be constituted by the motor of the vehicle, the calories being conveyed by air circulating in contact with a radiator through which a cooling fluid for the motor passes. A fan with possibly adjustable speed may be mounted in the conduit 11 to increase the rate of flow of air blown into the passenger space 10.

A system as described hereinabove is well known per se.

The temperature inside the passenger space may then be regulated by an occupant of the vehicle acting on the position of the valve 14 to take the real interior temperature TI in the passenger space to the value of a reference temperature TR displayed, by means for example of an adjusting knob.

Figure 2:
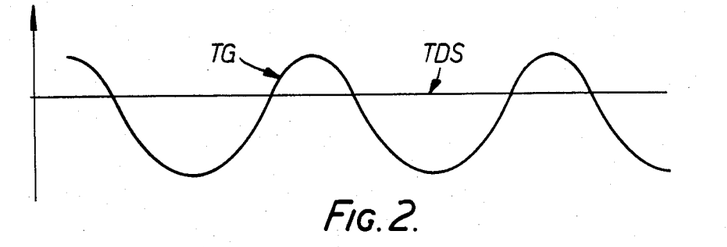
FIGS. 2 and 3 illustrate variations in temperature of blown-in air and in the temperature to be servo-controlled in the case of a conventional servo-control with proportional action for the system of FIG. 1.
Figure 3:
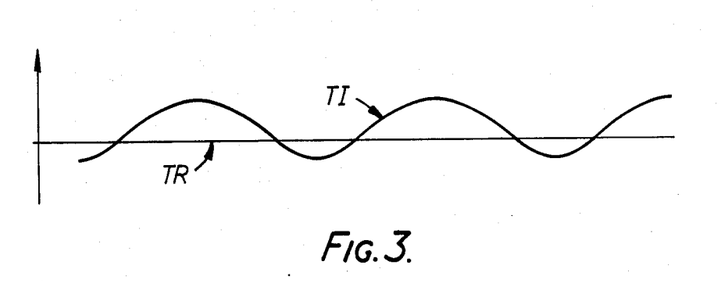

With conventional regulation by servo-control of the proportional type, the motor 15 is controlled with a speed proportional to the deviation between TR and TI and in a direction determined by the sign of this deviation. As shown in FIGS. 2 and 3, considerable residual oscillations then are observed on the curves showing the variation in time of the temperature TG of the air blown through the pipe 11 and into the passenger space, and of the temperature TI prevailing in the passenger space. In addition, it is observed that the oscillations of TI are not exactly on the reference value TR.

These imperfect results are due to the fact that the temperature TI is not only a function of the position of the valve 14, but also depends on other parameters such as: the temperature TE outside the passenger space, the speed of the vehicle, the engine speed, the rate of flow of the blown-in air, the volume of the passenger space . . . Certain of these parameters are known and others may vary in an unforeseeable manner.

Figure 4:
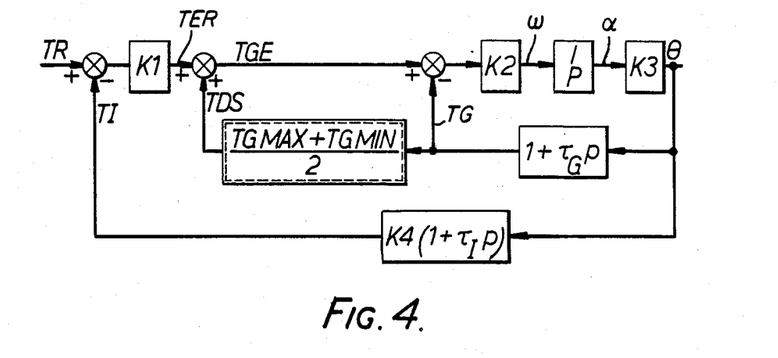
FIG. 4 shows a servo-control process according to the invention for the system of FIG. 1.

FIG. 4 illustrates a servo-control process according to the invention which makes it possible to considerably limit the residual oscillations of the regulated temperature with respect to the reference value, without it being necessary to measure the different parameters acting on the value of the regulated temperature.

In FIG. 4, TI, TR and TG have the same meanings as before; K1, K2, K3 are constant numbers; $\omega$ is the angular speed of the motor 15; $\alpha$ is the angular coordinate of the rotor of the motor 15 about its axis of rotation with respect to a given origin; and $\theta$ is the temperature of the air immediately downstream of the location of the mixer valve. At first approximation, it may be considered that $\theta$ is proportional to $\alpha$.

The servo-control process of FIG. 4 comprises a servo-control loop of proportional type to control the angular position $\alpha$ of the valve 14 so as to servo-control the real value TG of the blown-in air temperature by a calculated value TGE. In fact, $\omega = (K2)(TGE - TG)$. The transfer function between $\omega$ and $\alpha$ is of the integral $1/p$ type, and the transfer function between $\alpha$ and $\theta$ is of the proportional type: $\theta = (K3)(\alpha)$.

The value TGE is equal to the sum of two components TDS and TER: TGE = TDS + TER.

Figure 5:
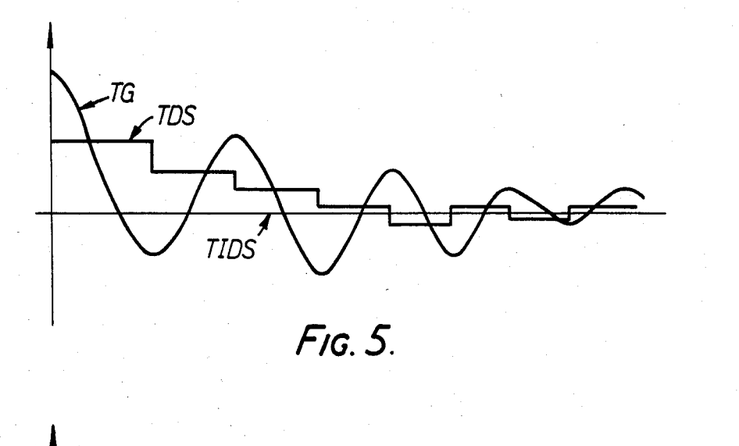
FIGS. 5 and 6 illustrate the variations in the blown-in air temperature and in the temperature to be servo-controlled in the case of the servo-control shown schematically in FIG. 4.

In the example illustrated, the component TDS has, in the course of each half-period of the blown-in air temperature TG, a value equal to the arithmetical mean between the two maximum and minimum values, TGEMX and TGEMN respectively, of TG determined last. As shown in FIG. 5, the curve representing the variations of TG in time presents residual oscillations of decreasing amplitude. This curve comprises a succession of peaks and troughs corresponding to so-called maximum and minimum values, TGEMX and TGEMN respectively, of TG. A period of TG is the time gap separating two consecutive peaks, or two consecutive troughs or, more generally, two consecutive instants when the derivative of TG with respect to time passes through the same value, in the same direction. In the case of FIG. 5, each half-period of TG begins immediately after TG has attained a maximum value TGEMX or minimum value TGEMN. From this instant and for a half-period of TG, TDS has for its value the arithmetical mean between this maximum value TGEMX or minimum value TGEMN and, respectively, the immediately preceding minimum or maximum value. A new value of TDS is calculated as soon as the following minimum or maximum value which marks the end of this half-period, is detected. The feedback TER=(K1).(TR−TI) is superposed on the component TDS.

FIG. 4 further mentions the transfer functions $(1+\tau_G p)$ between $\theta$ and TG, and K4. $(1+\tau_I p)$ between $\theta$ and TI, the coefficients $\tau_G$ and $\tau_I$ being functions of the different parameters other than $\theta$ acting on TG and TI, and K4 having a predetermined constant value.

Figure 6:
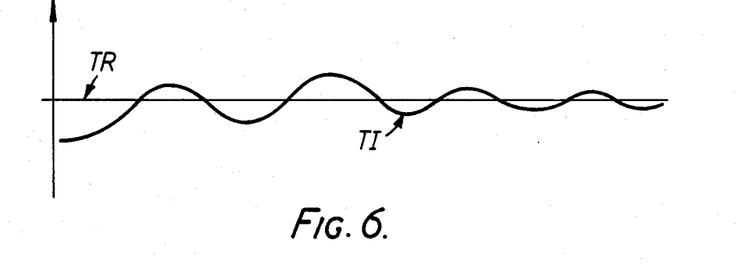

As may be seen in FIGS. 5 and 6, the residual oscillations of the curves representative of TG and TI decrease rapidly in amplitude and are centered on the values TIDS and TR. Temperature TIDS is the ideal blown-in air temperature, i.e. the blown-in air temperature which, taking into account the existing values of the different factors acting on the regulated temperature, makes it possible to satisfy the equality TI=TR. This ideal blown-in air temperature is automatically obtained, without having to measure all these factors. If one or more of these factors vary, the ideal blown-in air temperature is modified and TG is then automatically centred on this new value so as to maintain the equality TI=TR.

The execution of the servo-control which has just been described with reference to FIGS. 4 to 6 necessitates converters furnishing signals representative of TR, TI and TG, calculating means for providing the values of TDS, TGE and $\omega$, a circuit for controlling the motor 15 as a function of the value and of the sign of $\omega$, and a circuit for actuating the cold source.

Figure 7:
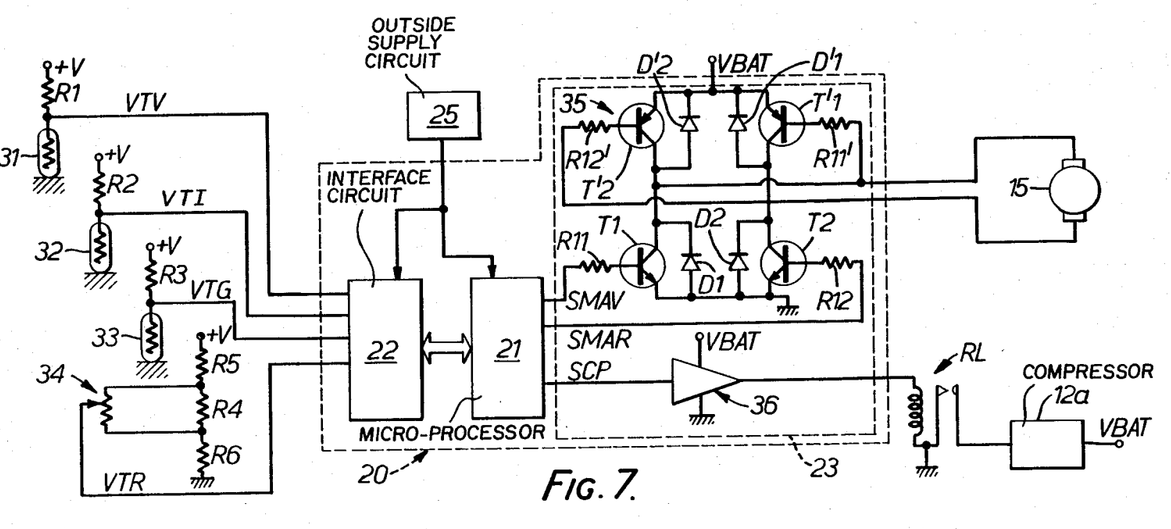
FIG. 7 schematically illustrates a servo-control device according to the invention.

A servo-control device combining these different elements is schematically illustrated in FIG. 7.

In this Figure, reference 20 designates a calculating assembly comprising a microprocessor 21 with its central processing unit CPU and its random access memories RAM, and a read-only programmed memory ROM, interface circuits 22 and 23, and busses interconnecting the elements of the assembly 20. The supply voltage for the circuits of the assembly 20 is furnished by an outside supply circuit 25, from the battery of the vehicle, for example.

The interface circuit 22 comprises analog inputs 22c where the information to be transmitted to the assembly 20 is received in analog form. The interface circuit 22 performs the function of analog multiplexing between the inputs and the function of analog-to-digital conversion of the incoming information.

The interface circuit 23 transmits to the motor 15 and to the compressor 12a of the cold source 12 the control information provided by the assembly 20.

The microprocessor 21 is for example of the MC 6805 type manufactured by a firm of the United States of America MOTOROLA INC., while the interface circuit 22 is, for example, of the MC 14443 type, manufactured by the same firm.

The incoming information comprise voltages VTV, VTI, VTG and VTR respectively representing the temperature TV of the evaporator of the cold source and the temperatures TI, TG and TR. These voltages are furnished by means of temperature sensors 31, 32, 33 and of a potentiometer 34. The temperature sensors 31, 32 and 33 are for example thermistors placed at the level of the evaporator of the cold source, in the passenger space 10, and in the conduit 11 for furnishing indications relative respectively to TV, TI and TG. The thermistors 31, 32 and 33 are each connected in series with a resistor R1, R2, R3 respectively, between earth and a terminal at a potential +V. The potentiometer 34 is connected to the terminals of a resistor R4 inserted between two resistors R5, R6 between earth and the terminal +V, and its slider is coupled mechanically to an adjusting member allowing an occupant of the vehicle to display the desired value TR.

The control information supplied by the assembly 20 include voltages SMAV, SMAR and SCP. The interface circuit 23 comprises a circuit 35 which receives the signals SMAV and SMAR and which supplies control signals to the motor 15 to rotate it at the speed and in the direction desired as a function of the signals received, and a circuit 36 which receives the signal SCP and controls the actuation of the compressor of the cold source, if necessary.

In the example illustrated, the circuit 35 is a bridge circuit known per se. Two transistors TI, T'I (NPN and PNP respectively) form two opposite arms of the bridge by their emitter-collector circuits and two transistors T2 and T'2 (NPN and PNP respectively) form the other two arms. Two opposite apexes of the bridge are respectively connected to earth and to a terminal having a potential VBAT equal to that of the battery, while the other two apexes are connected to the supply terminals of the motor 15. The signals SMAV and SMAR are applied via resistors R11, R12 respectively to the bases of the transistors TI and T2. The base of the transistor T'I is connected by a resistor R11' to the common point between the collectors of the transistors TI and T'2, and the base of the transistor T'2 is connected by a resistor R12' to the common point between the collectors of the transistors T2 and T'I. The functioning of the circuit 35 is well known; the motor 15 is supplied with the voltage VBAT having one polarity or with the reverse polarity voltage and rotates in one direction or in the other depending on whether the transistor TI or transistor T2 is unblocked. These transistors are directly controlled by the binary signals SMAV and SMAR produced by the assembly 20. These signals consist for example in rectangular pulses of determined frequency of which the amplitude varies between the high and low logic levels and of which the cyclic ratio is proportional to the speed $\omega$ calculated. The signal SMAV or the signal SMAR is produced depending on the direction in which the motor 15 must be driven in rotation.

The circuit 36 is an amplifier supplied with voltage VBAT and of which the input receives the signal SCP. This signal passes for example from low logic level to high logic level when it is necessary to actuate the compressor. After amplification, this signal controls a relay RL inserted in the supply circuit of the motor of the compressor 12a.

The read only programmed memory of the assembly 20 comprises the instructions necessary for the microprocessor to perform the tasks assigned thereto. For carrying out the servo-control process described hereinabove, the main tasks to be performed are indicated by the flow chart of FIG. 8A.

Figures 8A, 8B:
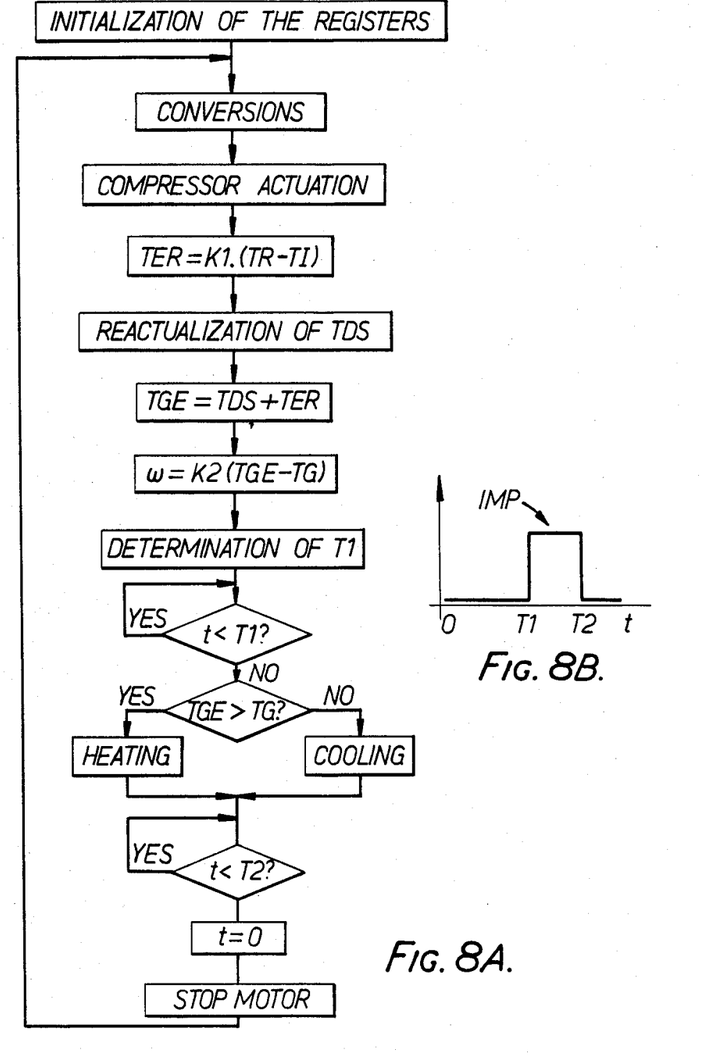
FIG. 8A shows, in the form of a flow-chart, the operations carried out by means of the device of FIG. 7 for effecting the servo-control process shown schematically in the FIG. 4.
FIG. 8B shows a pulse provided by the device of FIG. 7 for controlling a motor adapted to adjust the blown-in air temperature.

After a phase of initialization of the registers of the system, each period of this system (of duration T2) begins by converting the incoming data TV, TI, TG and TR.

The compressor is then actuated, if necessary. A particular flow chart showing actuation of the compressor will be described hereinafter with reference to FIG. 12.

The error component TER=KI. (TR−TI) is calculated from the measured values of TR and TI and from the recorded value of KI.

The following operation consists in the reactualization of TDS in the case of a maximum or minimum value of TG having been detected. A particular program showing the reactualization of TDS is described hereinafter with reference to FIG. 9.

The quantities TGE=TDS+TER and ω=K2. (TGE−TG) are then calculated, K2 having a predetermined recorded value.

From the value of ω, the time TI is determined, measured from the origin of the period of the system, and from which the motor 15 must be controlled up to the end of the period T2 for producing a pulse IMP (shown in FIG. 8B) of which the cyclic ratio β=(TI/T2) is proportional to ω with a predetermined, constant factor of proportionality k. The value of TI is therefore determined by calculating TI=(k) (ω) T2. TI must obviously have a value greater than a minimum value TIMIN corresponding to the time necessary to carry out all the operations from the beginning of the period T2 up to the calculation of TI. The cyclic ratio β is therefore at the most equal to a value which may be for example chosen at 60%. TI being calculated, and as soon as the time t measured from the beginning of the period is no longer less than TI, the direction of rotation of the motor 15 is determined by comparing TGE with TG. According to the result of the comparison, the pulse IMP is sent to the circuit 35 in the form of signal SMAV or SMAR to control, for example, heating or cooling. The motor is then stopped as soon as the time t is no longer less than T2, the register containing the value t being returned to zero. A new period of the system then commences.

Figure 9:
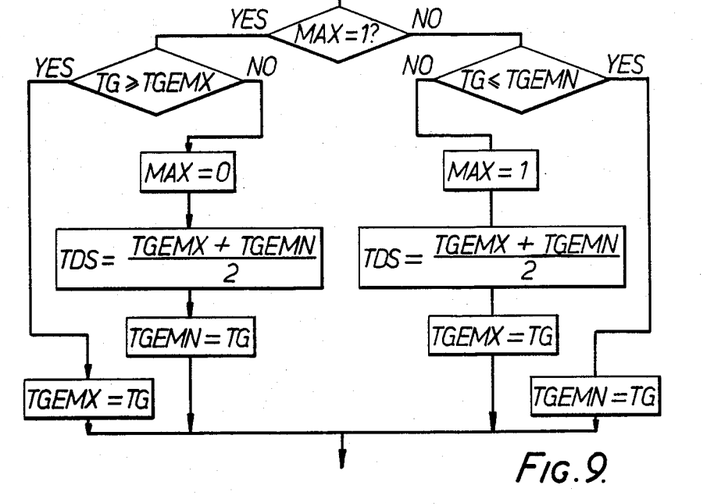
FIG. 9 shows, in the form of a flow chart, a detailed embodiment of one of the operations indicated in FIG. 8A.

FIG. 9 shows a flow a chart for reactualization of the value TDS. The main part of this flow chart concerns the search for values TGEMN and TGEMX.

In the example illustrated in FIG. 9, it is assumed that a maximum value TGEMX is first sought, a register (or "flag") MAX being positioned at 1 (MAX=1). The temperature TG is then increasing.

Every new measured value of TG is compared with the contents TGEMX of a register [TGEMX] of maximum value. The register TGEMX having been intialized to value 0 when servo-control was started, the inequality TG≧TGEMX is verified and the contents of [TGEMX] are reactualized to the value TG (TGEMX=TG). This continues as long as TG increases. On the contrary, as soon as a measured value of TG is lower than the preceding one (TG≦TGEMX), the [MAX] is positioned at 0 and the calculation TDS=½ (TGEMX+TGEMN) is effected, TGEMN being the contents of a register [TGEMN] of minimum value. This register is then reactualized at the last TG measured (TGEMN=TG).

A minimum is sought in similar manner. The equality MAX=0 having been verified, each value of TG is compared with the contents of [TGEMN]. If TG≦TGEMN, the register [TGEMN] is reactualized at value TG (TGEMN=TG) and the search for the minimum continues until TG≧TGEMN. In the latter case, the register [MAX] is repositioned at 1, calculation TDS=½ (TGEMX+TGEMN) is effected and the register TGEMX is reactualized at the last value TG measured (TGEMX=TG).

The value of TDS is thus reactualized each time that a new maximum or minimum of TG has been detected in the course of a period T2.

The actuation of the compressor of the cold source is controlled when negative calories are indispensable. This is obtained by producing signal SCP.

Figure 10:
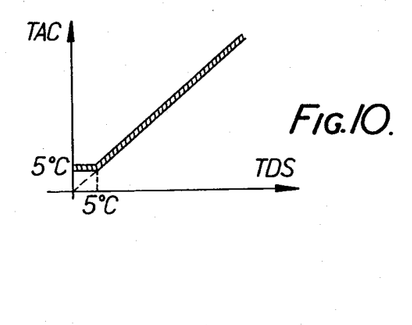
FIG. 10 is a graph illustrating the variations in the temperature of actuation of the compressor of the cold source a of an air-conditioning installation forming part of the system shown in FIG. 1.

FIG. 10 is a graph illustrating the relation between the calculated blown-in air temperature TDS and the temperature of action of the compressor TAC, i.e. the temperature for which the compressor must be started up or stopped. It will be noted that the temperature of action of the compressor follows the blown-in air temperature (TAC=TDS) from a minimum value, for example equal to +5° C., which enables the evaporator to avoid icing by preventing its temperature from going below 0° C.

Figure 11:
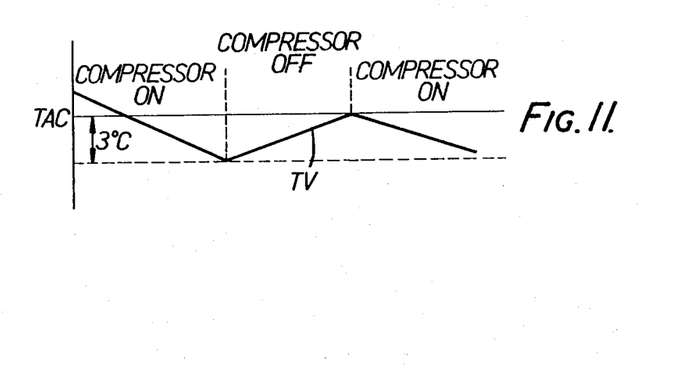
FIG. 11 is a graph which illustrates the development of the temperature of the evaporator of the cold source of the air-conditioning installation.

When the measured temperature of the cold source TV is greater than the temperature TAC for action of the compressor, the latter is started up by production of the signal SCP. The stopping of the compressor is then controlled when the temperature TV of the evaporator reaches a value lower than TAC by a predetermined number of degrees, for example 3° C. The temperature of the evaporator then rises and the signal SCP is again produced as soon as TV=TAC. The temperature of the evaporator therefore oscillates between TAC and TAC −4° C., as shown in FIG. 11. This possibility of oscillations of TV avoids an excessive use of the compressor, i.e. frequent stops and restarts.

Figure 12:
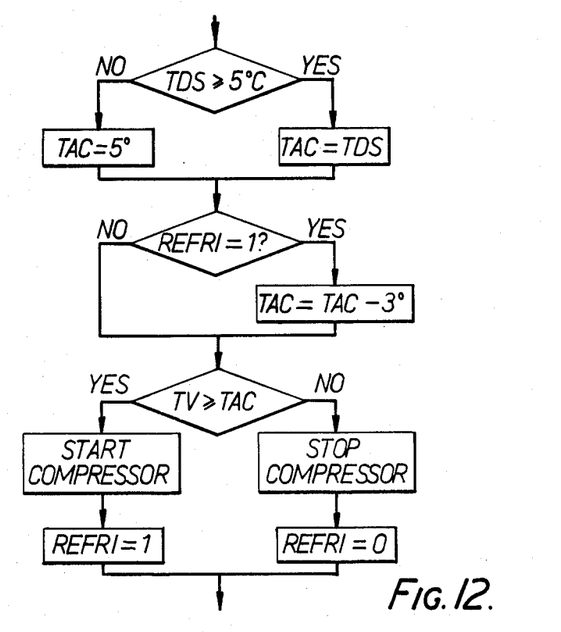
FIG. 12 shows, in the form of a flow chart, a detailed embodiment of the operation for actuation of the compressor of the cold source, said operation indicated in FIG. 8A.

The flow chart showing actuation of the compressor is shown in FIG. 12.

The contents TAC of a register [TAC] is set to value TDS, if TDS≧5° C., and is set to a value 5° C. if TDS≦5° C. Then, the contents of a register ("flag") REFRI are examined. If these contents are at 1 (refrigeration underway): the contents of the register TAC are reduced by 3°: TAC=TAC−3° C. The following phase consists in the comparison between the measured value of TV and the contents of the register TAC. if TV≧TAC, the compressor is started up (SCP=1) and the register [REFRI] is positioned at 1. If TV≦TAC, the compressor is stopped (SCP=0) and the register [REFRI] is positioned at 0.

The use of the device of FIG. 7 has been described hereinbelow for effecting the servo-control of the temperature TI. The resources of the micro-processor may be used to perform other tasks, for example demisting, defrosting.

Furthermore, although it has been envisaged hereinbefore to regulate the temperature in the passenger space of an automobile vehicle, other applications may be envisaged for the servo-control process and device according to the invention.

Thus, the servo-controlled magnitude TI may be the temperature inside premises or a room of an appartment. In this case, TG is, for example, the temperature of air-conditioning air or the temperature of water ciculating in a central heating circuit. The parameter α may then be the coordinate measuring the position of a valve regulating the rate of flow of heat-carrying fluid, or a magnitude associated with a member regulating the rate of flow of fuel for a boiler, or the intensity (or voltage) of a current supplying an electrical heating installation.

The servo-controlled magnitude may further by a physical magnitude other than a temperature, for example a pressure, a rate of flow, a speed, etc.

Various modifications or additions may, of course, to made to the embodiment described hereinabove of the servo-control process and device according to the invention without departing from the scope of protection as defined by the accompanying claims.

The reactualization of the value TDS may thus be effected, not in the course of each half-period, of TG, but once every n half-periods of TG, n being a whole number greater than 1. Whatever the periodicity of reactualization of TDS, the latter is preferably effected by taking into account the last detected values of TGEMX and TGEMN.

I claim:

1. Device for servo-controlling a first magnitude TI depending on at least one controllable parameter $\theta$, said device comprising:
    a first sensor means for furnishing a measuring signal representative of said first magnitude TI;
    a second sensor means for furnishing a measuring signal representative of a second magnitude TG which varies as a function of said parameter $\theta$;
    an adjusting member for furnishing a reference signal representative of a reference value TR;
    means for servo-controlling the value of said parameter $\theta$ and varying the second magnitude TG;
    means for calculating a value TGE by which said second magnitude TG must be servo-controlled;
    control means acting on said means for servo-controlling to vary said second magnitude TG by said calculated value;
    said means for calculating comprising: means for monitoring variations in time of said second magnitude TG; means for determining both a maximum value TGEMX and a minimum value TGEMIN of said second magnitude TG, during previous n half-period time variation of the second magnitude TG, n being a whole number; means for calculating a value TER as a function of the deviation between the reference value TR and the first magnitude TI, and calculating a value TDS equal to the arithmetic mean between said previously determined maximum value TGEMX and said minimum value TGEMIN of the second magnitude TG; and means for providing the value TGE as being equal to TDS+TER.

2. Device according to claim 1, wherein said means for servo-controlling the valve of said parameter comprises means for controlling the temperature prevailing inside an enclosure air conditioned by a fluid conveying calories or negative calories inside a conduit, wherein said second sensor is placed inside said conduit.

3. Device according to either one of claims 1 or 2, wherein said means for servo-controlling the value of the parameter $\theta$ comprises:
    a motor; and
    a member the position of which is adjusted by said motor.

4. Device according to claim 1, wherein said means for calculating a value TDS includes means for calculating the value of TDS every n half-periods of the second magnitude TG, n being a whole number.

5. Device according to any of claims 1, 2, or 4 wherein said means for calculating a value TGE comprises:
    a microprocessor with at least one central processing unit and associated read-only memory, random-access-memory, and interface circuits.

6. A process for servo-controlling a first magnitude TI depending on at least one controllable parameter $\theta$, wherein a control signal TGE is provided as a function of the deviation between a reference value TR and the real value of the first magnitude TI, and the value of the parameter $\theta$ is regulated as a function of TGE to servo-control a second magnitude TG which is related to the first magnitude TI and which varies as a function of said parameter $\theta$, said process comprising the steps of:
    (a) monitoring the variations in time of the second magnitude TG to be servo-controlled by the value of the control signal TGE,
    (b) substantially determining both the maximum value TGEMX and the minimum value TGEMN of the second magnitude TG during previous n half-period time variations of the second magnitude TG, n being a whole number,
    (c) calculating the value TDS as being equal to the arithmetical mean between said previously determined maximum value TGEMX and minimum value TGEMN of the second magnitude TG,
    (d) calculating TER as a function of the deviation between the reference value TR and the real value TI of the first magnitude,
    (e) calculating the control signal TGE as being equal to TDS+TER,
    (f) regulating the value of said parameter $\theta$ as a function of TGE, and
    (g) servo-controlling the second magnitude TG as a function of said parameter $\theta$.

7. The process according to claim 6 wherein step (c) comprises determining TGEMX and TGEMN every n half-periods of the second magnitude TG, n being a whole number.

8. The process according to claim 6 wherein step (c) comprises calculating TDS by utilizing the last determined values of TGEMX and TGEMN before calculating TDS.

9. The process according to claim 6 wherein step (d) comprises calculating TER=(K1) (TR−TI), K1 being a constant positive number.

10. The process according to claim 6 wherein the step of controlling further comprises, servo-controlling the second magnitude TG with a servo-control which utilizes proportional action.

11. Process according to claim 6 wherein said step of servo-controlling said second magnitude TG comprises servo-controlling the temperature prevailing inside an enclosure air-conditioned by a fluid conveying calories or negative calories, wherein said second magnitude TG is the temperature of the fluid.

12. Process according to claim 11, wherein said temperature being servo-controlled comprises the temperature prevailing inside the passenger space of an automobile vehicle, wherein said second magnitude TG is the temperature of air blown into the passenger space.

13. Process according to claim 11 wherein said parameter $\theta$ being controlled is the position of a mixer valve.

* * * * *